Figure 1:
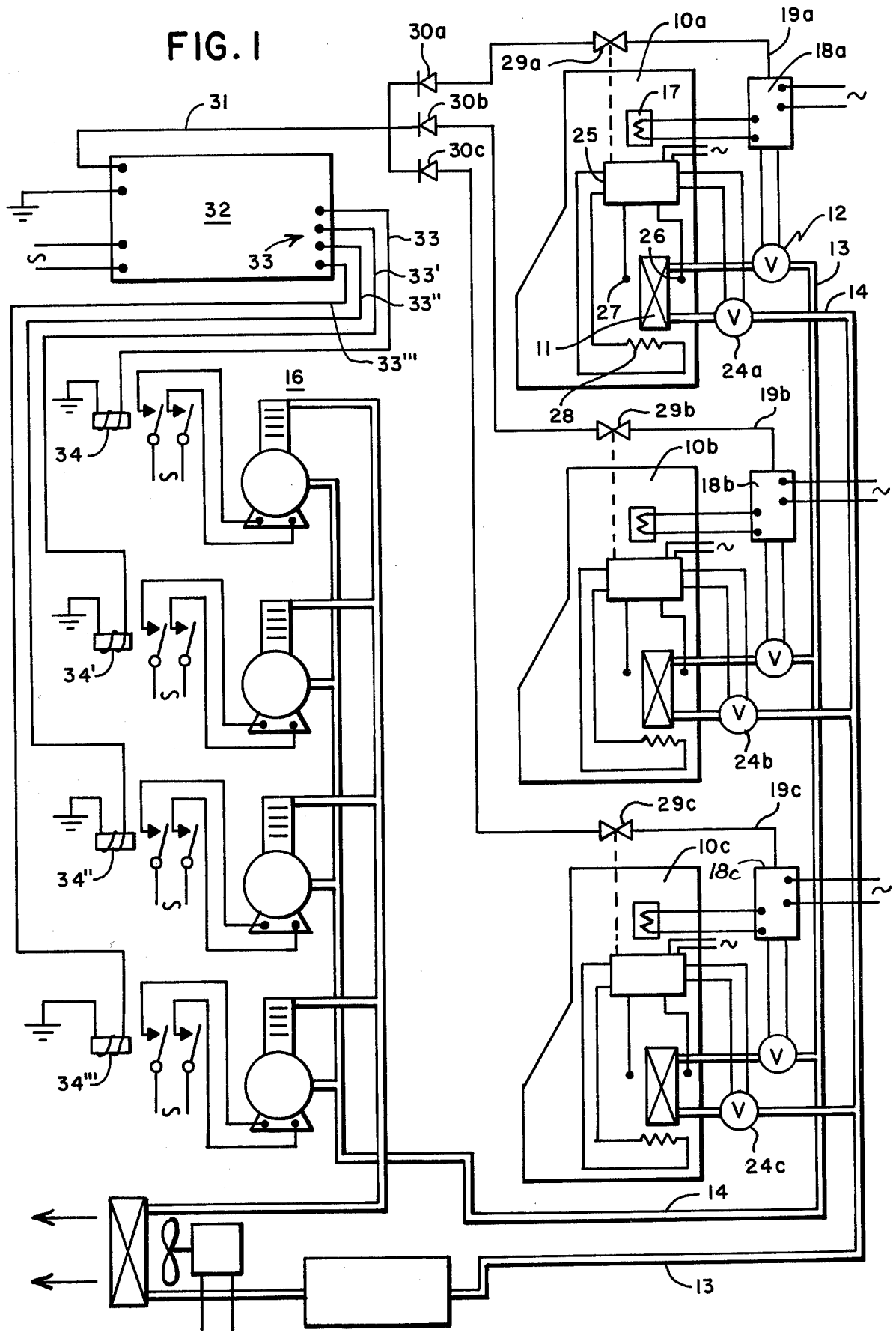

United States Patent [19]
Nelson

[11] 4,084,388
[45] Apr. 18, 1978

[54] REFRIGERATION CONTROL SYSTEM FOR OPTIMUM DEMAND OPERATION

[75] Inventor: Lorne W. Nelson, Bloomington, Minn.

[73] Assignee: Honeywell Inc., Minneapolis, Minn.

[21] Appl. No.: 739,405

[22] Filed: Nov. 8, 1976

[51] Int. Cl.$^2$ ............................................. F25D 21/06
[52] U.S. Cl. .................................. 62/152; 62/196 A; 165/22
[58] Field of Search .................. 236/1 E; 165/22; 62/229, 175, 152, 196 A, 207; 307/39

[56] References Cited

U.S. PATENT DOCUMENTS

| 3,453,837 | 7/1969 | Sandstrom et al. | 62/140 |
| 3,788,386 | 1/1974 | Demaray | 165/22 |
| 3,911,354 | 10/1975 | Stanton | 236/75 X |
| 3,933,197 | 1/1976 | Zimmer | 165/22 X |
| 3,948,060 | 4/1976 | Gaspard | 62/175 |

Primary Examiner—William E. Wayner
Attorney, Agent, or Firm—Clyde C. Blinn

[57] ABSTRACT

A control sysem for controlling a plurality of refrigeration compressors has an input circuit for receiving a plurality of control signals from control devices for a plurality of evaporators connected to the refrigeration compressors with means for controlling the control signal of the evaporator having the greatest load to control the total operating capacity of the refrigeration compressors. Each of the input circuits has means for rendering the control signal input ineffective from a particular evaporator when the evaporator is in a defrosting cycle to allow the signal from the evaporator having the greatest load control the operating capacity of the refrigeration compressors.

1 Claim, 4 Drawing Figures

REFRIGERATION CONTROL SYSTEM FOR OPTIMUM DEMAND OPERATION

BACKGROUND AND SUMMARY OF THE INVENTION

While it is known to be old to optimize a control system and allow one of a plurality of operating loads having the greatest demand control the output of temperature conditioning apparatus, such as in a pneumatic system of the K. G. Kreuter et al. U.S. Pat. No. 3,338,519 and in a heating and cooling system as shown in the D. E. Zimmer et al. U.S. Pat. No. 3,933,197, the present invention is concerned with a plurality of food refrigeration display cases each of which has an evaporator connected to a refrigerator system having a plurality of compressors. Previously, the compressors were controlled off of some low pressure controller to maintain a refrigerant pressure sufficient to satisfy the load which might be imposed on the refrigeration apparatus by any one of the plurality of evaporator cases.

The present invention provides an individual control device for each evaporator of the display cases or a plurality of display cases which has an output signal indicative of the load of that particular evaporator or evaporators. A plurality of such control devices have each of their output circuits connected, through a means to select the highest demand signal, to a control panel for controlling the total operating capacity of the refrigeration compressors. Specifically, the control device controls the suction pressure of the display case by a valve in the refrigerant line from the evaporator and provides an output signal indicative of the evaporator load. The output signal of each of said control devices is connected by means of a diode to the input of a control circuit and the control signal having the greatest magnitude from the control device of the evaporator having the greatest load, controls the level of output of the plurality of refrigeration compressors by sequentially turning more or less of the compressors in an "on" operation. Such a system maintains the level of output of the refrigeration apparatuses sufficient to maintain a flow of refrigerant from the evaporator having the greatest load.

FIG. 1 is a schematic representation of the refrigeration system showing the plurality of display cases each having an evaporator to which refrigerant is delivered from a refrigeration apparatus having a plurality of refrigeration compressors.

Figure 2A:
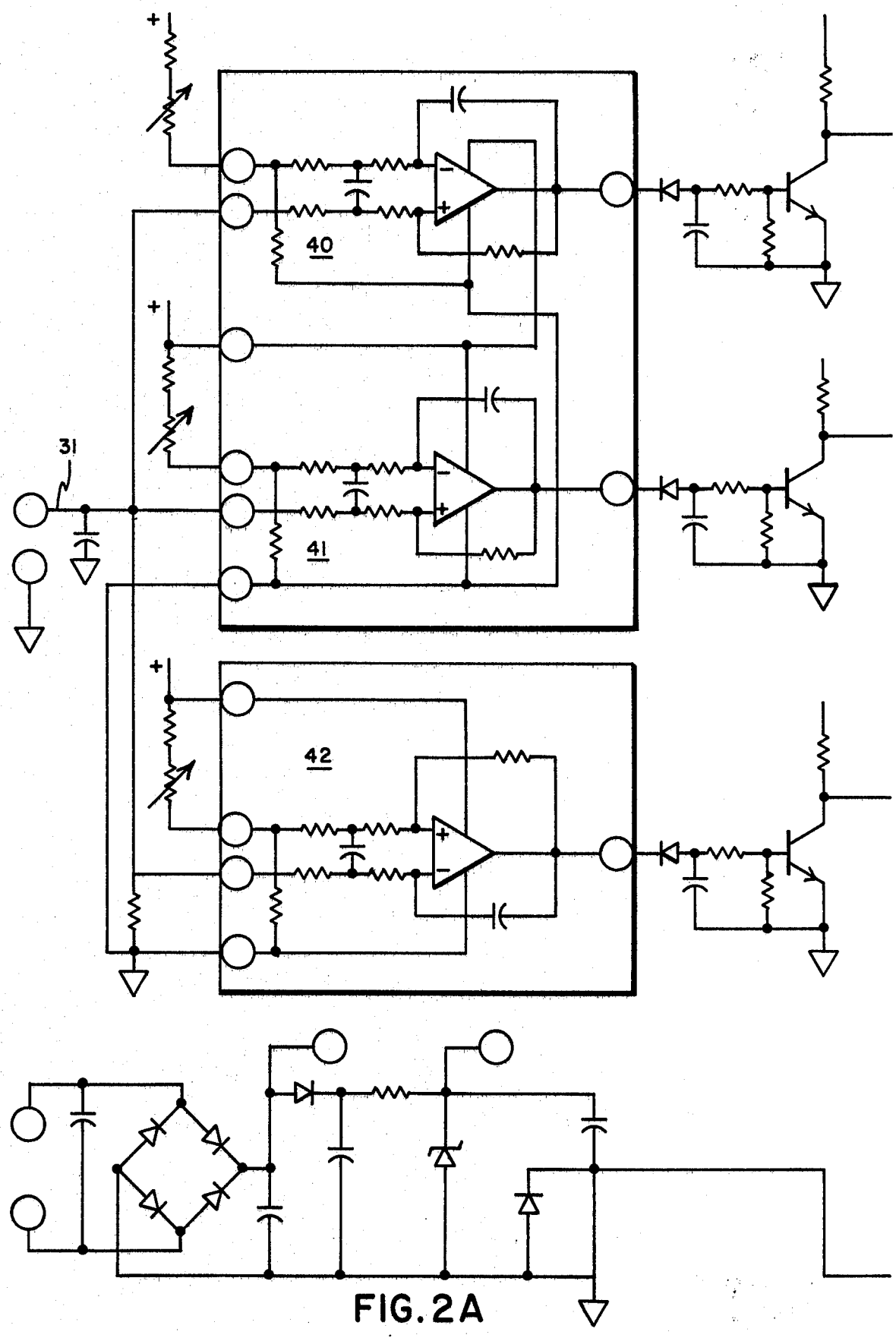
Figure 2B:
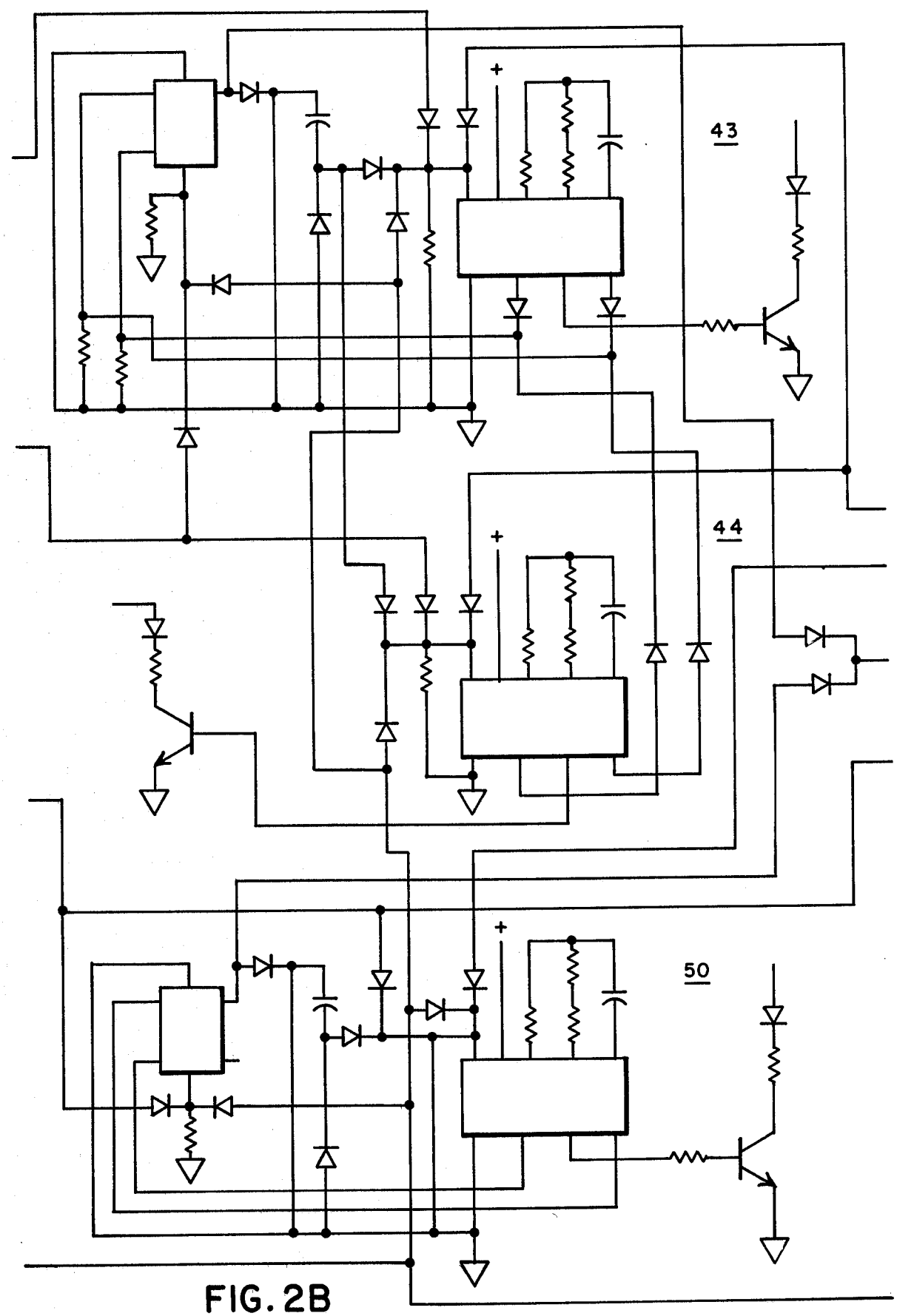
Figure 2C:
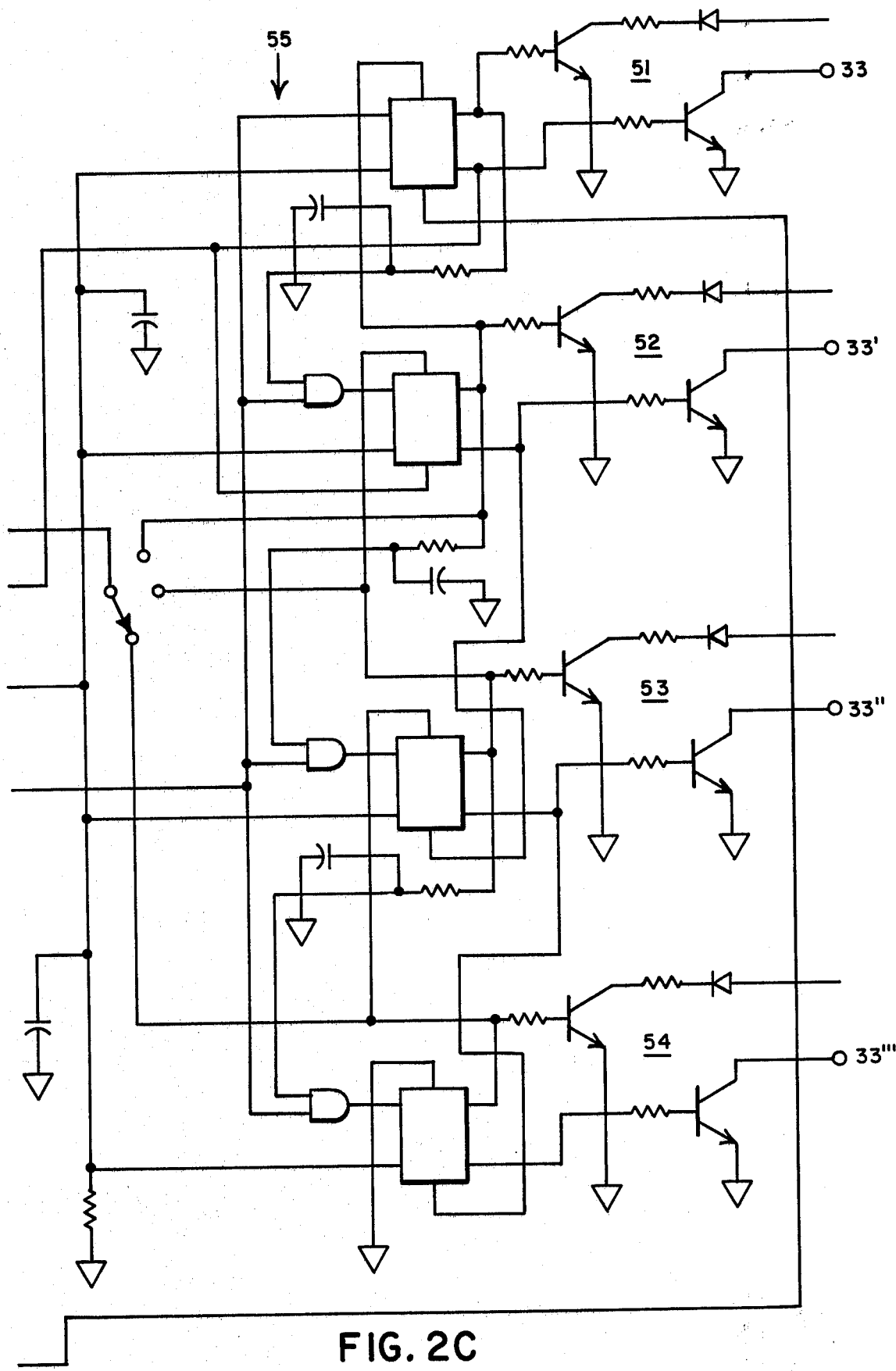

FIG. 2 made up of FIGS. 2A, 2B and 2C are schematic showings of the control circuit providing the input circuit to which the individual signals are fed to provide an output signal for sequentially controlling the refrigeration compressors.

DESCRIPTION OF THE INVENTION

Referring to FIG. 1, a plurality of display cases 10a, 10b and 10c are shown. The display cases are for storing frozen food in a supermarket and the food is maintained at a predetermined low temperature by air passing through a refrigeration evaporator 11 to be cooled to some low temperature in a conventional manner. The flow of refrigerant to evaporator 11 might be controlled by a conventional expansion valve to maintain a predetermined "superheat". A valve 12 is connected in the suction line to control the suction pressure on evaporator. Refrigeration pipes 13 and 14 connect evaporator 11 to a conventional multi-stage refrigeration apparatus 16 comprising a plurality of refrigeration compressors. As the temperature of a temperature responsive means or sensor 17 changes from a setpoint, a control device or panel 18 modulatingly controls the operation of the suction pressure valve 12. Such a control device for modulating the operation of valve 12 is shown in the U.S. Pat. No. 3,911,354, to D. J. Stanton issued Oct. 17, 1975, for Condition Responsive Current Control Units. An output circuit 19a from the control device 18a provides an output signal indicative of the position of valve 12, the suction pressure and thus the load of evaporator 11. Another control device 25 similar to that shown in the C. L. Sandstrom et al. U.S. Pat. No. 3,453,837 which issued July 8, 1969, for Defrost Control Apparatus, has a pair of temperature responsive elements 26 and 27 responding to the differential temperature of the air passing through evaporator 11 to provide a control of an electrical heater 28 and a high side pressure cutoff valve 24a when the evaporator 11 needs a defrost operation. Simultaneously with the operation of the defrosting of evaporator 11, switch 29a is opened to break the output circuit 19a from the control circuit 18a.

Input circuits 19a, 19b and 19c are connected through individual unidirectional current conducting devices or diodes 30a, 30b and 30c, respectively, to the input circuit 31 of the control panel 32. Control panel 32 has a plurality of output circuits 33 connected to individually control the relays 34 of each of the refrigeration compressors depending upon how many of the output circuits 33 are energized, a total refrigeration capacity can be selected.

Referring to FIG. 2 made up of FIGS. 2A, 2B and 2C, the schematic circuit of control panel 32 is shown. Input circuit 31 as shown in FIG. 2A received an input commonly fed to modules 40, 41 and 42 which are set for different thresholds of input such as 125%, 90% and 80%, respectively. Depending upon what the input signal threshold is at, the timing circuits 43, 44 and 50 are used to trigger the operation by stepping or sequential timing operation circuit 55 to provide outputs at the output circuits 51, 52, 53 and 54 which control each of the plurality of refrigeration compressors. Timing circuit 55 provides sequential operation of the compressors to increase the number of compressors operating depending upon the threshold of the input signal at 31.

When the input signal at 31 is above the 125% threshold, circuit 40 provides an output to the timing apparatus 43 so that after a predetermined period of time, the stepping apparatus 55 sequences the first compressor into operation by energizing the output circuit 33. If the input signal remains at the 125% threshold value, another compressor will be turned on by energizing the output circuit 33'. With a continuance of the high input signal above the 125% threshold, all the compressors will be sequenced on at a fairly rapid rate by the timing mechanism 43 and stepping circuit 55 by outputs being fed from circuits 33, 33', 33" and 33"'.

With a smaller input signal to the input circuit 31 below 125% threshold but above the 90% threshold value, input circuit 41 provides an output to timing apparatus 44 which would sequence the compressors on in a similar manner but at a slower rate. When the input signal drops below the 80% threshold value, circuit 42 provides an output which energizes the timing apparatus 50 to deenergize the compressors through the sequencing circuit 55 in a reverse manner until all the compressors are deenergized. By means of the control panel 32, the magnitude of the input signal not only selects whether the sequencing circuit 55 operates to turn on the compressors or turn off the compressors, but the timing circuits 43, 44 and 50 provide for the operation of the sequencing in a predetermined timed interval.

OPERATION OF THE INVENTION

Referring to FIG. 1, each of the refrigeration display cases 10a, 10b and 10c have a predetermined load to maintain a selected temperature in the case by the temperature responsive element 17. As the temperature increases, the output of the temperature responsive element 17 provides a control of the valve 12 through the control device 18 to modulatingly change the suction pressure of evaporator 11. A signal is available over the circuit 19 indicative of the position of valve 12 and thus the refrigeration load of the particular evaporator.

While it would be possible to maintain the output of the refrigeration apparatus 16 with some pressure control so that the pressure was always sufficient to take care of any of the loads, such would not only unduly operate the refrigeration apparatus but would be an inefficient use of electrical energy. By connecting the output signal of circuit 19a, 19b and 19c through the diodes 30a, 30b and 30c, respectively, to the input circuit 31 of the control panel 32, and by means of a reverse voltage bias, the diode only allows the signal having the highest magnitude to pass into the input circuit 31. The output of the control panel 18a, 18b and 18c having the greatest load passes to the input circuit 31 and is used to control the capacity of the refrigeration apparatus 16.

Assuming that evaporator 10a has the greatest load, such as a startup from a defrost operation, the input signal to input 31 has a high threshold value (above 125%). The high threshold value causes the circuit 40 of FIG. 2a to be energized to energize the timing apparatus 43 and bring on the operation of the first compressor through output circuit 33. If the high level of input signal continued, a second compressor is energized in a predetermined time period over circuit 33'. If the input signal from control device 18a dropped in value to slightly above 90% threshold value or another evaporator control panel 18b or 18c had a higher signal, the signal takes over the control. If the control signal is slightly above the 90% threshold value, control circuit 42 is energized through control timer 44 and thus increase the amount of compressor capacity by bringing on the third compressor through the energization of circuit 33", but at a slower time interval.

By means of circuit 42, when the input circuit was below the 80% threshold value, the compressors are deenergized in a sequential manner by turning the compressors off in a predetermined sequential time. Depending upon the input signal from one of the evaporators having the greatest load, the capacity of the refrigeration apparatus 16 is adjusted.

If at any time a defrosting operation takes place by the energization of control device 25, one of the switches 29a, 29b and 29c is opened to remove that particular evaporator from the control of the compressor capacity and the high pressure valve 24 is closed. The control signal from another of panels 18a, 18b and 18c takes over the control through the control panel 32 until the defrost operation had terminated and relay 29 again closes.

The embodiments of the invention in which an exclusive property or right is claimed are defined as follows:

1. In an energy conservation control system for controlling a plurality of refrigeration compressors to maintain the operating capacity of the operating compressors at a level to satisfy the load to each of a plurality of evaporators controlled by a control device thereby maintaining the total operating capacity dependent upon the load of the evaporator having the greatest load comprising;

a control having an input adapted to be connected to the control device of each of the evaporators wherein a control signal from each control device is indicative of the cooling load of the evaporator and an output adapted to be connected to each of the refrigeration compressors, said input comprising means for selecting the control signal of the control device of the evaporator having the greatest load to control said output, said output being adapted to selectively energize the refrigeration compressors dependent upon the magnitude of said control signal to maintain the total operating refrigeration capacity sufficient to satisfy the load of the evaporator having the greatest demand, said control device is a temperature controlled valve to control the flow of refrigerant of each evaporator to maintain the temperature at a predetermined value, said control signal of each control device is an electric signal proportional to the flow of refrigerant of the evaporator so that as the flow increases to a maximum said control signal is a maximum, said means for selecting a signal of said input comprising a diode to allow the largest of said control signals to pass to said output, and said output being an electric signal providing for the control of the total operating capacity of the refrigeration compressors proportional to said control signal passing to said input, said output comprising a circuit for a sequential operator for energizing the plurality of refrigeration compressors in sequence, said output increasing the number of compressors in operation depending on the magnitude of said control signal passing through said diode from the control device of the evaporator having the greatest load, and said circuit comprising circuit means adapted to be controlled by means responsive to a need of defrost of the evaporator to disconnect said input from the control device of the evaporator being defrosted to allow another control signal of a control device to control the operating capacity of the refrigeration compressors.

* * * * *